Barnard M. Marks
INVENTOR.

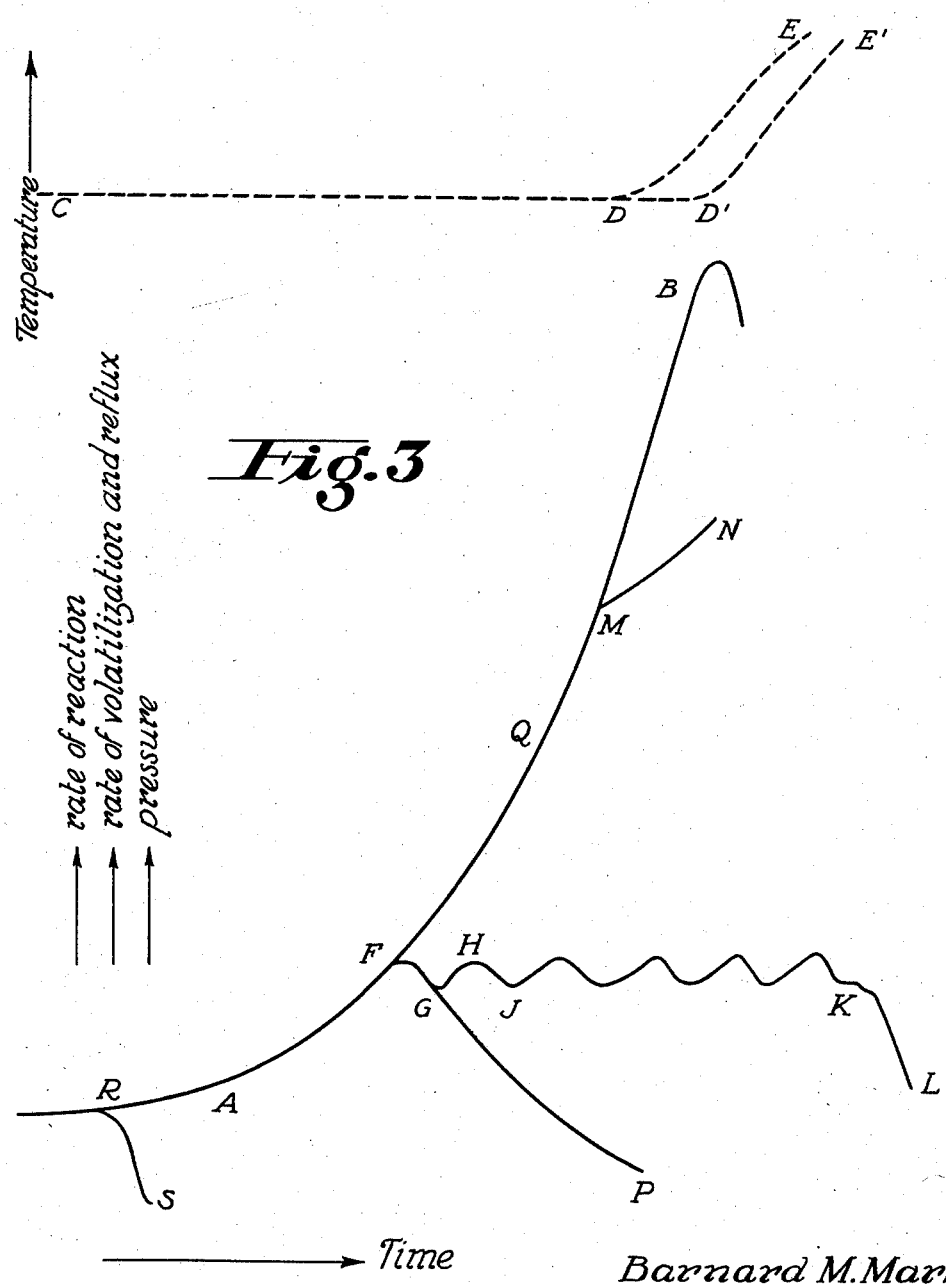

Patented Aug. 21, 1945

2,383,069

UNITED STATES PATENT OFFICE 2,383,069

POLYMERIZATION OF ETHENOID MONOMERS

Barnard M. Marks, Upper Montclair, N. J., assignor to E. I. du Pont de Nemours & Company, Wilmington, Del., a corporation of Delaware Application July 23, 1940, Serial No. 347,084

4 Claims. (Cl. 260—83)

The present invention relates to the polymerization of ethenoid monomers and, more particularly, to improvements in their polymerization, on a commercial scale, in so-called granular form.

The ethenoid monomers, of which methyl methacrylate, vinyl acetate and styrene are important examples, are in most cases mobile liquids which, as individuals or in admixture with each other or with auxiliary ingredients, are susceptible of polymerization to resinous solids under the influence of heat, of light, and of certain catalysts.

A convenient procedure for the polymerization of such monomers on a commercial scale is that which is commonly designated granular polymerization and which comprises polymerization of the monomer while maintained in the form of droplets suspended in a non-solvent vehicle, ordinarily water. The usual procedure involved introducing the monomer, together with a catalyst of polymerization and a dispersing agent, into water in a vessel provided with an agitator and means for heating its contents. Agitation of this mixture, with the assistance of the dispersing agent, causes the monomer to become broken up into droplets suspended in the water, and agitation is continued during an application of heat which, with the assistance of the catalyst, causes polymerization of the monomer. The resulting polymer is recovered in the form of corresponding globules or granules.

For reasons more fully discussed hereinafter, the use of this general process on a commercial scale has been characterized by certain practical difficulties of keeping the droplets of liquid, as they are converted into globules of resin, from adhering to each other and to the surfaces of the vessel and of the agitator. This clustering of the globules of resin is a well recognized characteristic of this general process if special means are not taken to prevent it and it is obviously objectionable from a mechanical standpoint, particularly as in an extreme case it may damage the moving parts of the equipment. Further, it impairs the quality and the utility of the resinous product since the clustered material cannot be thoroughly washed in the manner required to free it from granulating agents and other auxiliary reagents present during the polymerization, and since also the clustered masses, even if they can be removed from the reaction vessel without difficulty, cause inconvenience and loss in subsequent processing of the resinous polymer. Thus the formation of clusters impairs the salable yield of the product.

Efforts heretofore made to obviate or minimize the formation of clusters have in many cases resulted in reduction of the effective capacity of equipment and in prolongation of the time required for the completion of polymerization, and have added appreciably to the cost of the polymeric product. Such measures have included a close limitation upon the ratio of ethenoid monomer to aqueous vehicle, with corresponding limitation upon the effective capacity of given equipment, and the use of relatively large proportions of dispersing agents, with resulting impairment of the clearness and color of the polymeric product, or added difficulty in purifying it, and with objectionable increase in the proportion of the polymer produced in the form of fine globules too small to be separated afterward from the aqueous vehicle by practicable commercial methods.

It is an object of the present invention to effect improvements in the polymerization of ethenoid monomers by the so-called granular method, and more particularly to reduce or eliminate the formation of clusters, i. e., to reduce or eliminate the tendency of the individual globules or granules of polymer to adhere to each other in the course of the reaction of polymerization. A further object of the invention is to effect this improvement in uniformity and yield of product by a simple procedural step involving simple equipment readily operated, and without appreciable extension of the time required for the completion of the reaction, without diminishment of the effective capacity of existing equipment, and without the use of a large proportion of dispersing agent. Other objects will appear from the description of the invention given hereinafter.

The above objects are accomplished according to the present invention by polymerizing an aqueous suspension of an ethenoid monomer in a closed reaction vessel provided with means of condensing and returning to the vessel volatilized material, by initiating polymerization of the monomer and thereafter restricting the polymerization reaction to a rate below that which will cause clustering of the polymerizing material due to an excessive rate of reflux, and, further, by apparatus especially designed for restricting the polymerization of the ethenoid monomer to the desired rate.

In the commercial operation of this general type of polymerization, it is necessary to avoid the loss of volatilized monomer. If such volatilized matter is condensed but not returned to the reaction batch undergoing polymerization, it not only reduces the productive capacity of the equipment but the granular polymer produced is "grainy," i. e., the granules are not uniform because of the progressive change in composition of the reaction batch. Accordingly, it has been the practice to provide some type of reflux condenser for the return of all of the volatilized material to the reaction batch.

The present invention is based, in the first instance, on the discovery that a fundamental cause of the objectionable clustering of the globules of resin, as this general type of polymerization has usually been carried out heretofore, is the condensed monomer returning to the reaction batch from the condenser at an excessive rate.

From a consideration of simple energy relationships, it can be appreciated that the formation of smaller spheres from larger ones, or from a mass of liquid monomer, can be accomplished only by the introduction of energy. This energy is provided by the agitator, while the granulating agent serves to reduce the rate at which the inherently unstable physical equilibrium is destroyed or shifted. When liquid monomer is returned to the surface of the reaction batch, an appreciable time is required before it can be redispersed to the form of small spheres and during this time this undispersed monomer upsets, locally at least, the unstable equilibrium established by agitation in the presence of a granulation agent. The influence of a locally high concentration of monomer results in an increase in the size of the spheres of liquid monomer by impairing the stability of the films of granulating agent enclosing the spheres and, if these larger dimensions are allowed to persist, the resulting coarse granules of polymer not only promote non-uniformity in the quality of the product but also serve as nuclei for the objectionable formation of clusters.

A local excess of undispersed monomer coming into contact with droplets which have reached a semi-solid or solid condition likewise has the result of increasing the size of the granules and the further objectionable result of so softening their surfaces that they adhere to the wall of the vessel and to each other, and so form clusters.

A secondary cause of the formation of clusters is adhesion of the granules to the warm surfaces of the reaction vessel, particularly in the presence of undispersed monomer. During the gradual polymerization of droplets to granules, the material passes through a state in which it is distinctly adhesive; this is aggravated and protracted by contact with undispersed monomer, as already mentioned. There is a tendency for the granules, at this stage, to attach themselves to the walls of the vessel and, from this starting point, to build up in local deposits or crusts which may or may not ultimately be dislodged by the agitator to constitute clusters suspended in this batch.

The present invention, while still retaining the important feature of condensing and returning all volatilized material to the reaction batch, overcomes the tendency of the globules of resin to cluster due to the return of the monomer to the reaction batch by restricting the rate of the polymerization reaction so that the rate of reflux is not sufficient to cause this detrimental effect. In its preferred embodiment, the present process restricts the rate of polymerization reaction by abstracting heat from the aqueous reaction mixture. That is, the reaction vessel is cooled to check the rate of volatilization of monomer, which is directly proportional to the rate of the polymerization reaction, thereby reducing the rate at which undispersed monomer is returned to the reaction batch, the net result being that clustering is prevented.

In more specific form, the invention comprises carrying out the polymerization of the monomer dispersed in an aqueous vehicle in such manner that the polymerization reaction is allowed to accelerate up to a point approaching that at which the refluxing rate becomes so great that clustering would result and, thereafter, until the completion of the polymerization reaction, abstracting heat from the suspension merely for a period sufficient momentarily to terminate the acceleration of the rate of the polymerization reaction each time the exothermic reaction builds up to that point again.

The invention further comprises an apparatus for carrying out the process, this apparatus including a closed reaction vessel, a reflux condenser connected thereto, a constriction in the passage from vessel to condenser, and means for determining the difference between pressures on the opposite sides of the constriction. Where the condenser is maintained at atmospheric pressure it is, of course, simply necessary to provide means for determining the pressure on the reaction vessel side of the constriction.

In this apparatus the constriction in the passage from reaction vessel to condenser, by partially obstructing the passage of vapors from the vessel into the condenser, causes the development of a pressure in the reaction vessel measurably higher than that prevailing in the condenser. The amount of this difference in pressure increases with the rate of the polymerization reaction and, in the operation of the present process, cooling is applied to the reaction batch when this difference in pressure reaches a predetermined value corresponding to a rate of reaction not too rapid to be kept from further increase by application of the cooling means available, and not so rapid as to cause refluxing at an objectionably high rate, and yet rapid enough not to be substantially retarded by this cooling. Preferably, the predetermined difference in pressure is utilized to actuate automatic means of effecting application of the cooling to the reaction batch.

Also, it is preferred to provide a by-pass line for the return of refluxed liquid from the condenser to the reaction vessel so that the constriction may not be obstructed by liquid; the by-pass line is provided with a seal to prevent passage of vapor through it.

In the drawings accompanying the present invention:

Fig. 3 comprises two curves illustrating the variations in certain conditions when operating a polymerization reaction according to this invention.

Figure 1:
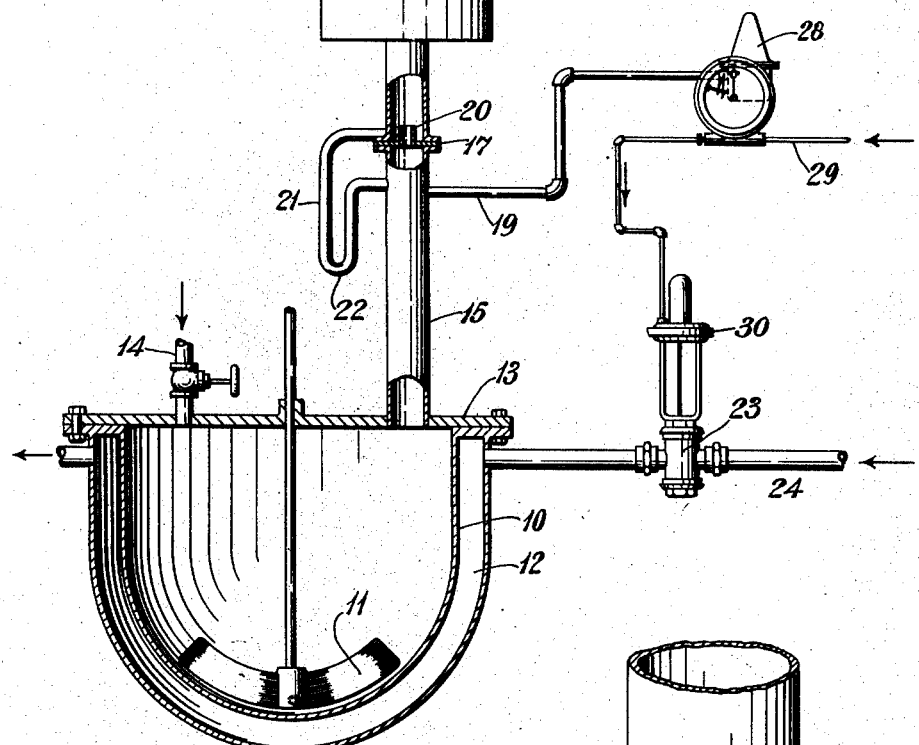
Fig. 1 illustrates, more or less diagrammatically, an apparatus constructed in accordance with the present invention and which includes automatic means for cooling the reaction batch.

Referring to Fig. 1, a reaction kettle 10 is equipped with an agitator 11, water-jacket 12 and a gas-tight cover 13. Through the cover 13 passes the valved loading port 14 and the vapor line 15 which connects with the condenser 16. In the vapor line 15 is inserted a plate 17 provided with a relatively small orifice to effect a constriction in the vapor line 15 between the reaction kettle 10 and the condenser 16.

To prevent obstruction of the orifice in the plate 17 by condensed liquid running down the vapor line 15 from the condenser 16, a tubular dam 20 is provided surrounding the orifice, together with a by-pass pipe 21 into which liquid diverted by the dam 20 runs and through which such liquid is emptied into the vapor line 15 below the plate 17. The by-pass pipe 21 comprises a U-shaped portion 22 of sufficient height to provide a liquid seal which will prevent the passage of vapors through the by-pass pipe 21.

With the polymerization reaction in progress in the kettle 10 and vapors being evolved, the constriction in the vapor line 15 caused by the plate 17 will result in a greater pressure developing in the vapor line 15 between the plate 17 and the kettle 10 than in the vapor line 15 between the plate 17 and the condenser 16—in fact, if the condenser 16 is maintained at atmospheric pressure, as would normally be the case, the vapor line 15 above the plate 17 will also be at atmospheric pressure.

The differential in pressure on the opposite sides of the plate 17 serves as the basis for controlling the polymerization reaction in the kettle 10 in accordance with the present invention. As the reaction accelerates, the rate of vaporization likewise accelerates and the pressure in the vapor line 15 between the plate 17 and kettle 10 increases correspondingly. To stop the acceleration of the reaction, cold water is flowed through the water-jacket 12 and regulation of the flow of water is automatically controlled in the apparatus shown in Fig. 1, as will now be explained.

A vapor line 19 connects the vapor line 15 at a point between the plate 17 and kettle 10 with the high pressure side of the bell type differential pressure controller 28. With the condenser 16 maintained at atmospheric pressure and, hence, the vapor line 15 above the plate 17 also at atmospheric pressure, there is no need to connect the vapor line 15 above the plate 17 with the low pressure side of the controller 28 which is simply vented to the atmosphere. If the condenser 16 is to be maintained at greater than atmospheric pressure then another vapor line connecting the vapor line 15 above the plate 17 with the low pressure side of the controller 28 would be necessary to get the differential in pressure.

When the pressure transmitted through the line 19 reaches a predetermined value, the controller functions in conventional manner to open a valve in the air supply line 29 and the air actuates a diaphragm motor 30 which, in turn, operates the controlling valve 23 on the cold water line 24, permitting water to flow through the water-jacket 12 until the reaction is modified enough for the pressure communicated to the controller 28 to drop to a predetermined point whereupon the controller shuts off the air flow in the line 29 and the diaphragm motor 30 closes the controlling valve 23 shutting off the cold water flow.

In the manner described the reaction in the kettle 10 may be regulated entirely automatically on the basis of the differential in pressure in the vapor line 10 on opposite sides of the plate 17.

The controller 28, diaphragm motor 30, and controlling valve 23 are all conventional equipment readily available in the market. Obviously, any other means for automatically controlling the flow of water through the water-jacket 12 on the basis of the differential pressure on the opposite sides of the constriction in the vapor line 15 could be used without departing from the scope of this invention.

Because the polymerization reaction is an exothermic one, there is no need to supply heat to the reaction kettle 10 once the polymerization reaction is initiated. To initiate this reaction heat may be conveniently supplied by running hot water through the water-jacket 12 but, as will be understood by those skilled in the art, this supply of heat should be terminated once the reaction is well under way and the cold water supply connected to the water line 24 for controlling the reaction in the manner of the present invention. Any other convenient means for supplying heat to initiate the polymerization reaction may be employed without departing from the scope of the present invention.

Figure 2:
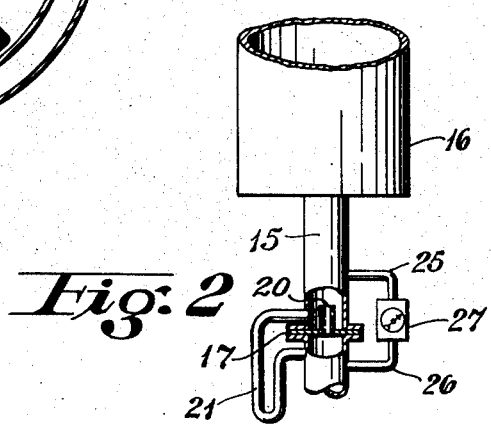
Fig. 2 is a fragmentary view of the apparatus shown in Fig. 1 but in which the cooling of the reaction batch is to be regulated by manual operation.

If desired, the automatic control feature may be eliminated and the valve controlling the flow of water through the water-jacket 12 may be manually operated. In Fig. 2 is illustrated a portion of the vapor line 15 and condenser 16 of Fig. 1 in which arms 25 and 26 communicating, respectively, with the vapor line 15 above and below the plate 17, are connected with the manometer 27. By watching the pressure variations as indicated by the manometer 27 an operator may regulate the valve controlling the flow of water to the jacket 12 in accordance with the present invention.

In Fig. 3 are shown two curves which facilitate the description of the procedure of the present invention and an understanding of what is believed to be the mechanism of its operation. The lower curve in Fig. 3, shown in solid lines, indicates the course of change in the rate of the polymerization reaction taking place in the reaction kettle and, hence, the course of change in the rate of volatilization from the reaction batch and of reflux of condensed vapors back into the reaction batch, as ordinates, with time as the abscissa. In the upper curve shown in Fig. 3, shown in broken lines, the abscissa is again time and the ordinate is temperature of the reaction batch. These curves are diagrammatic but the abscissae are the same for both and the two curves are drawn in proportion and in relation to each other with respect to the abscissae.

As conventional in the granular polymerization process, the monomeric compound, containing catalyst and optionally, modifying ingredients, is mixed with a dispersing phase, usually water, containing a dispersing agent, such as polymethacrylic acid, and suitable salts which establish and maintain optimum conditions. The reaction is initiated by the application of heat. Because the reaction is autocatalytic and exothermic, its rate rapidly increases to such a point that a considerable portion of the mixture is volatilized. In practical commercial operation, it is necessary to avoid the loss of volatilized monomer.

In the lower curve of Fig. 3, a low rate of reflux is indicated up to the time A at which point the reaction begins to gather momentum as a result of its exothermicity. In the absence of restraint, the rate of reaction, and hence of reflux, will increase at an increasing rate, as indicated diagrammatically by the portion AB of the curve. The rate of reflux ultimately becomes so rapid as to cause the evil effects already described. During this same period there is at first no rise in the temperature of the batch or of the vapor entering the condenser since there is at first no change in the composition of the vapors. Toward the end of the reaction, however, the temperature, which has been running substantially uniform (CD in upper curve), begins to rise as a result of a deficiency in residual monomer in the bath and, following approximately the course DE, finally approaches the temperature of boiling water.

Since any damage to the batch resulting from excessive refluxing has already been done before the time D has been reached, the temperature of the batch or of the vapors furnishes no indication of the time at which the reaction should be checked by cooling.

Neither can the composition of the vapors entering the condenser (constituting a binary mixture), nor of the two-layer condensate refluxing therefrom, be utilized to indicate the progress of the reaction through the critical period during which control by cooling can feasibly be exercised. For a given set of conditions, particularly of ratio of monomer to water, the composition of the vapors remains unchanged up to the point D, at which point it is already too late to check the reaction by cooling.

It has been found that the rate of volatilization from the batch constitutes a reliable criterion of the progress of the reaction and the present invention utilizes the rate of production of vapor as a means of its own control. The vapor line serving to carry vapors from the space above the reaction batch in the kettle into the reflux condenser is, in accordance with the invention, constricted and the evolution of vapors is thereby caused to build up a slight positive pressure in the space in the kettle above the charge so that there develops a difference between the pressure in this space and the pressure in the space above the constriction. The magnitude of the differential in pressure depends, of course, upon the narrowness of the constriction. A manometer in communication with these spaces thus can serve as an indicator of the rate at which vapors are being evolved, and, correspondingly, as a guide to the determination of the moment at which cooling is to be applied. Preferably, however, a predetermined difference of pressure is utilized to actuate a mechanism which introduces cooling water into the jacket of the kettle as heretofore described and shown in Fig. 1.

Since in equipment thus constructed the pressure developed below the constriction, which is at the most of small magnitude, will be roughly proportional to the rate at which vaporization is taking place, the portion AB of the lower curve in Fig. 3 represents diagrammatically the pressure as well as the rate of evolution of vapor and the rate of reaction.

It has already been stated that if the reaction is allowed to proceed without restraint, the rate will increase as indicated by the portion AB of this curve. This increase can, however, be checked by the application of a cooling influence. The application of this restraint in accordance with the invention is illustrated by the portion FL of the curve.

At F, a cooling influence is applied, e. g., cold water is run briefly through the jacket of the reaction vessel. The acceleration of the rate of reaction is stopped thereby and, in practice, the rate of reaction is decreased slightly (FG). But upon removal of the cooling influence, the reaction, having been merely slightly slowed down, accelerates again (GH). When the pressure again builds up to the level of F, at H, the cooling influence is again applied and the rate again stops rising and falls slightly (HJ), as before. This cycle is repeated until polymerization approaches completion, when the rate of the reaction decreases for lack of unconverted monomer (KL).

The checking of the acceleration of the reaction when the pressure has reached the value at F or at H is a means of avoiding the excessively rapid vaporization and refluxing which takes place in the upper part of the curve. This repeated retardation of the reaction will prolong the time required for its completion but this is not an important consideration since the time required from this point on is short anyway unless the checking is effected at too early a stage in the reaction.

Ideally, the application of the cooling influence would terminate the acceleration of the rate of the reaction, but not decelerate it, so that the part FK of the curve would become a horizontal straight line. But this ideal cannot be attained in equipment of commercial size because of the lag which delays the taking effect of any operation of control; it is not practicable to terminate the acceleration without causing slight deceleration, and acceleration begins again when the cooling effect has been dissipated, making it necessary to apply the cooling influence again.

The promptness with which the acceleration of the rate of the reaction is checked, the extent to which it is decelerated, and the rate of the ensuing acceleration from the lowered rate will depend upon the point in the progress of the reaction at which the cooling influence is applied, upon the sensitivity of response of the equipment to changes in the rate of reaction, upon the heat-abstracting capacity of the cooling means in proportion to the size of the batch, upon the composition of the batch, i. e., the characteristics and proportion of the ethenoid monomer therein, upon catalytic and autocatalytic influences, et cetera. These will determine the character of the fluctuating part FK of the curve and the details of its deviation from the ideal smooth horizontal line.

The portion AMN of the lower curve in Fig. 3 is diagrammatically illustrative of a failure properly to carry out the procedure of the invention through delaying too long the application of cooling. The evolution of vapor has proceeded at constantly increasing rates up to the point M, at which time cold water is introduced into the jacket. The result is merely a retardation of the rate of increase of speed of the reaction. At this more advanced and more vigorous stage in the progress of the reaction, the rate of development of heat by the exothermic reaction is too great to be balanced by the available cooling influence. The reaction continues to accelerate along the course MN and the chilling has served merely to delay somewhat the ultimate completion of the reaction without having succeeded in holding the rate of reflux below the danger point. The application of a cooling influence in accordance with the invention must be made before the speed of the reaction has developed so far as this. A point such as Q will be the latest at which the cooling influence can be effectively applied.

On the other hand, if the cooling influence be applied too soon, as at R, the reaction will be too readily suppressed (RS) and will then have to be reinitiated by heating. This will prolong the time for completing the polymerization of a batch unnecessarily.

At any point from A onward, to Q, the brief application of a cooling influence stops the acceleration of the reaction and decelerates the reaction slightly without suppressing it. AQ, then, represents the stage in the progress of the reaction in which the technique of control is applied in accordance with the invention.

That portion of the curve indicated by AFGP is diagrammatically illustrative of inefficient procedure. Chilling is begun at F and the reaction follows the course FG as already described, but cooling is erroneously not discontinued soon enough. The reaction is slowed down to the level P from which it will not accelerate unless stimulated by heating. Furthermore, another practical difficulty arises if the reaction is thus interrupted at such a stage, in that the viscosity of the partly polymerized substance makes difficult the maintenance of its proper dispersion when the reaction is again stimulated by heat.

Corresponding to the portion FK of the lower curve in Fig. 3 is the temperature curve CD'E'. It will be observed that no significant increase in the temperature of the reaction batch or of the vapors is developed until the reaction is well along toward completion, and that at this stage the temperature rises in the manner already described and illustrated by the course DE, going gradually up from the level D', and reaching the level E' only at the end of the reaction.

The following example illustrates a specific procedure in accordance with the invention:

*Example I.*—The following components constitute the reaction batch:

Methyl methacrylate monomer
kilograms__ 100.0
Water _____do____ 123.5
Benzoyl peroxide_____grams__ 800.0
Polymethacrylic acid_____do____ 10.0
Sodium hydroxide (to partially neutralize
 the polymethacrylic acid)_____grams__ 2.6
NaH$_2$PO$_4$ _____do____ 55.0
Na$_2$HPO$_4$ _____do____ 1030.0

Into a reaction vessel of 100 gallons capacity are loaded the water, the polymethacrylic acid (dispersing agent) and the salts (buffering agent), and the mixture is thoroughly stirred to effect solution. Then the ethenoid monomer is introduced, and the benzoyl peroxide (catalyst) previously dissolved in a portion of the monomer. The loading port is closed, the agitator set into motion, and the batch is heated. About thirty minutes is required to bring the batch up to about 70° C. At about this temperature polymerization actively begins and the temperature of the batch gradually rises. The reaction proceeds by reason of its exothermicity. After about twenty minutes longer, the rate of polymerization is such that the difference between the pressure above the batch in the kettle and the pressure in the vapor line to the condenser beyond the constriction reaches the value previously determined by experiment as corresponding to a stage in the reaction at which the acceleration of the reaction must be stopped if difficulties with clustering are to be avoided. The temperature of the batch is now 82° C.

Cold water (at 14° C.) is now applied to the jacket for a brief period. The acceleration of the reaction is thereby stopped and its rate decreases slightly. There is a corresponding decrease in the pressure within the vessel. In the absence of further chilling, the rate of the reaction again begins to accelerate and the predetermined pressure is reached for a second time. Again cold water is applied. This cycle is repeated several times during the time required for substantial completion of the polymerization, which amounts to about 7 to 10 minutes from the initial application of cold water.

During the first part of this period the temperature remains substantially unchanged at about 82° C. but toward the very end it rises to about 84 to 86° C.

The polymethyl methacrylate formed by this procedure is in the form of individual separate globules of small size. Not more than a negligible proportion has agglomerated or adhered to the equipment. It is correspondingly easy to wash and to dry.

The control of the reaction as described may be effected by manual operation of valves controlling the circulation in the jacket, under the guidance of the indications of a manometer which is connected to show the amount of difference between the pressure in the kettle and that in the condenser, i. e., on the two sides of the constriction. Preferably, however, in regular commercial operation, the manometer is replaced by an automatic device which responds to a predetermined difference in pressure and actuates the appropiate valves, introducing cold water until the pressure falls, and subsequently introducing cold water again when the pressure again rises to the predetermined value.

In a representative run made as thus described the following data are recorded on a chart attached to the automatic control device which has been set to turn cold water into the jacket when the differential in pressure becomes 0.5 inch of water (2.0 scale units) and to shut off the cold water again when it falls again below 2.0 units. Zero time is the moment at which the differential in pressure first reaches 2.0 units.

| Time | | Pressure |
|---|---|---|
| Min. | Sec. | |
| 0 | 0 | 2.0(a) |
| 0 | 5 | 2.0 |
| 0 | 10 | 1.9 |
| 0 | 40 | 0.4 |
| 1 | 25 | 2.0(b) |
| 1 | 30 | 2.05 |
| 1 | 35 | 2.0 |
| 1 | 55 | 0.35 |
| 3 | 40 | 2.0(c) |
| 3 | 50 | 2.1 |
| 3 | 55 | 2.0 |
| 4 | 20 | 0.35 |
| 5 | 10 | 2.0(d) |
| 5 | 25 | 2.8 |
| 5 | 40 | 2.0 |
| 6 | 0 | 0.35(e) |
| | | (Decreases thereafter) |

When the differential of pressure first reaches the predetermined value (2.0 units) at (a), cold water introduced into the jacket checks the acceleration of the reaction almost immediately. The second time, at (b), the exothermic "momentum," as it were, is greater, and the cold water remains running for 10 seconds. The third time, at (c), 15 seconds is required to bring the pressure again below 2.0. The fourth time, at (d), the water runs for 30 seconds while the pressure is running up past 2.0 units and being forced down again by the chilling. Thereafter the pressure does not rise again, since not enough unconverted monomer remains to cause the rate of reaction to build up again.

In this run, each successive application of cold water is continued longer than its predecessor before the pressure is thereby reduced to the standard 2.0 units, and the pressure rises a little higher each time before it is made to fall. It would thus appear that the capacity of the reaction to accelerate is increasing throughout the reaction. This is believed to be due to the development of autocatalytic influences since the rise in temperature is hardly sufficient to account for it.

Whatever the true explanation of this phenomenon, it shows the desirability of not deferring too long the initial application of the cooling influence.

The technique and equipment herein described is applicable in general to the polymerization in suspension in an aqueous medium of ethenoid monomers as individuals or in admixture with each other and/or auxiliary ingredients such as plasticizers, lubricants, and the like, ordinarily with the assistance of catalysts, dispersing agents and buffering agents. Obviously the operating conditions, within the scope of the invention, must be established for any specific combination on the basis of simple experimentation in the available equipment but, once so established, will continue to serve as a reliable guide in subsequent manufacture. The technique is applicable, if desired, to polymerization under pressure.

In several important respects, the invention offers advantages over the previously known technique of polymerizing ethenoid monomers in suspension in aqueous media. The agglomeration of the granules is altogether or very largely prevented with consequent betterment of yields and of quality of product, and saving of time and expense heretofore vested in dealing with clustered polymer. The protection against agglomeration afforded by the invention makes it entirely practicable to operate with high ratios of monomer to vehicle and thus to increase very substantially the productive capacity of a given reaction vessel; thus, with methyl methacrylate, ratios of monomer to vehicle as high as 1 to 1 can be used without difficulty. Furthermore, the invention makes its practicable to reduce the proportion of dispersing agent considerably below those heretofore employed in efforts to prevent agglomeration and thereby not only benefits the quality of the product, and decreases the difficulty of purifying it, but also decreases the loss of product in the form of fines.

As many apparently widely different embodiments of this invention may be made without departing from the spirit and scope thereof, it is to be understood that the invention is not limited to the specific embodiments thereof except as defined in the appended claims.

I claim:

1. Process of polymerizing an aqueous suspension of a monomeric polymerizable organic liquid compound which is a solid at normal temperature in its fully polymerized state, in a reaction vessel provided with means for condensing and returning to said vessel volatilized material, which comprises initiating polymerization of said monomer and, thereafter until the completion of the polymerization reaction, abstracting heat from said suspension for a period sufficient momentarily to terminate the acceleration of the rate of said polymerization reaction whenever said polymerization reaction accelerates to a rate approaching that sufficient to cause clustering of the polymerizing compound due to an excessive rate of reflux.

2. Process of polymerizing an aqueous suspension of a monomeric polymerizable organic liquid compound which is a solid at normal temperature in its fully polymerized state, in a reaction vessel provided with means for condensing and returning to said vessel volatilized material, which comprises initiating polymerization of said monomer and, thereafter until the completion of the polymerization reaction, abstracting heat from said suspension for a period sufficient momentarily to terminate the acceleration of the rate of said polymerization reaction and to decelerate said rate slightly whenever said polymerization reaction accelerates to a rate approaching that sufficient to cause clustering of the polymerizing compound due to an excessive rate of reflux.

3. Process of polymerizing at substantially atmospheric pressure an aqueous suspension of a monomeric polymerizable organic liquid compound which is a solid at normal temperatures in its fully polymerized state, in a reaction vessel provided with means for condensing and returning to said vessel volatilized material, which comprises heating said aqueous suspension to initiate polymerization of said monomer and, thereafter until the completion of the polymerization reaction, cooling said suspension for a period sufficient momentarily to terminate the acceleration of the rate of said polymerization reaction whenever said polymerization reaction accelerates to a rate approaching that sufficient to cause clustering of the polymerizing compound due to an excessive rate of reflux.

4. Process of polymerizing at substantially atmospheric pressure an aqueous suspension of monomeric methyl methacrylate in a reaction vessel provided with means for condensing and returning to said vessel volatilized material, which comprises heating said aqueous suspension to initiate polymerization of said monomeric methyl methacrylate and, thereafter until the completion of the polymerization reaction, cooling said suspension for a period sufficient momentarily to terminate the acceleration of the rate of said polymerization reaction whenever said polymerization reaction accelerates to a rate approaching that sufficient to cause clustering of the polymerizing methyl methacrylate due to an excessive rate of reflux.

BARNARD M. MARKS.